(12) United States Patent
Kuenzi et al.

(10) Patent No.: US 11,386,729 B2
(45) Date of Patent: Jul. 12, 2022

(54) ACCESS CONTROL SYSTEM WITH DYNAMIC PERFORMANCE TUNING

(71) Applicant: Carrier Corporation, Palm Beach Gardens, FL (US)

(72) Inventors: Adam Kuenzi, Silverton, OR (US); Michael Lang, Oregon City, OR (US); Adam Purdue, Salem, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/325,652

(22) Filed: May 20, 2021

(65) Prior Publication Data

US 2021/0272400 A1 Sep. 2, 2021

Related U.S. Application Data

(63) Continuation of application No. 16/489,745, filed as application No. PCT/US2018/018595 on Feb. 19, 2018, now Pat. No. 11,074,771.

(60) Provisional application No. 62/465,974, filed on Mar. 2, 2017.

(51) Int. Cl.
*G07C 9/00* (2020.01)
*H04W 52/02* (2009.01)

(52) U.S. Cl.
CPC .... *G07C 9/00309* (2013.01); *H04W 52/0258* (2013.01); *G07C 2009/00317* (2013.01); *G07C 2209/63* (2013.01)

(58) Field of Classification Search
CPC ........... H04W 52/0258; G07C 9/00309; G07C 2209/63; G07C 2009/00317; Y02D 70/166; Y02D 70/164; Y02D 70/142; Y02D 70/14; Y02D 70/144; Y02D 70/00; Y02D 70/10

See application file for complete search history.

(56) References Cited

U.S. PATENT DOCUMENTS

| | | | |
|---|---|---|---|
| 6,950,645 B1 | 9/2005 | Kammer et al. | |
| 7,230,933 B2 | 6/2007 | Bahl et al. | |
| 7,653,017 B2 | 1/2010 | Huylebroeck | |
| 7,680,520 B2 | 3/2010 | Ruuska et al. | |
| 7,693,485 B2 | 4/2010 | Parys | |
| 8,073,388 B2 * | 12/2011 | Grushkevich | H04W 74/06 455/41.2 |
| 8,213,864 B1 * | 7/2012 | Zhodzishsky | G06F 1/3209 455/41.2 |
| 8,780,881 B2 | 7/2014 | Venkatachalam et al. | |

(Continued)

FOREIGN PATENT DOCUMENTS

| | | |
|---|---|---|
| CA | 2873247 A1 | 11/2013 |
| CN | 202023427 U | 11/2011 |

(Continued)

OTHER PUBLICATIONS http://www.cstoronto.edu/~catalin/ut-thesis.pdf.

(Continued)

*Primary Examiner* — Brian E Miller
(74) *Attorney, Agent, or Firm* — Bachman & LaPointe, P.C.

(57) ABSTRACT

A method of dynamically changing a mode of advertising for at least one of a multiple of access controls, including transmitting advertisements from an access control at a nominal mode; and changing the nominal mode in response to a pre-set schedule.

12 Claims, 4 Drawing Sheets

(56) References Cited

U.S. PATENT DOCUMENTS

| | | | |
|---|---|---|---|
| 8,971,807 B2 | 3/2015 | Hillyard | |
| 9,326,239 B2 * | 4/2016 | Polo | H04W 52/0216 |
| 9,462,623 B2 * | 10/2016 | Jakusovszky | H04W 4/80 |
| 9,483,887 B1 | 11/2016 | Soleimani | |
| 9,503,969 B1 * | 11/2016 | Zakaria | H04W 52/0229 |
| 9,554,240 B2 | 1/2017 | Dragomir et al. | |
| 9,565,514 B2 | 2/2017 | Agarwal et al. | |
| 9,641,964 B2 | 5/2017 | Kulkarni et al. | |
| 9,706,357 B2 | 7/2017 | Heo et al. | |
| 9,986,594 B2 | 5/2018 | Goel et al. | |
| 10,015,653 B2 | 7/2018 | Lang et al. | |
| 10,021,511 B2 | 7/2018 | Jeon | |
| 10,028,324 B2 | 7/2018 | Kwon et al. | |
| 10,172,169 B2 | 1/2019 | Lee et al. | |
| 10,181,871 B2 | 1/2019 | Chen et al. | |
| 10,182,336 B1 | 1/2019 | Stockton et al. | |
| 10,321,293 B2 | 6/2019 | Jackson et al. | |
| 2007/0047506 A1 | 3/2007 | Froehling et al. | |
| 2010/0283579 A1 * | 11/2010 | Kraus | G07C 9/00944 340/5.7 |
| 2012/0154108 A1 * | 6/2012 | Sugaya | G06F 9/451 340/5.1 |
| 2013/0176107 A1 * | 7/2013 | Dumas | G07C 9/27 340/5.61 |
| 2014/0094123 A1 | 4/2014 | Polo et al. | |
| 2015/0161834 A1 | 6/2015 | Spahl et al. | |
| 2015/0235486 A1 | 8/2015 | Ellis et al. | |
| 2016/0066137 A1 | 3/2016 | Kulkarni et al. | |
| 2016/0165387 A1 | 6/2016 | Nhu | |
| 2016/0371961 A1 | 12/2016 | Narang et al. | |
| 2017/0295453 A1 * | 10/2017 | Mahasenan | H04W 76/10 |
| 2017/0312530 A1 | 11/2017 | Schilling et al. | |
| 2019/0385394 A1 | 12/2019 | Kuenzi et al. | |
| 2019/0387473 A1 | 12/2019 | Lang et al. | |
| 2020/0051352 A1 | 2/2020 | Rydkin | |
| 2021/0256785 A1 * | 8/2021 | Kanteti | H04W 52/0254 |

FOREIGN PATENT DOCUMENTS

| | | | |
|---|---|---|---|
| CN | 104581646 A | 4/2015 | |
| CN | 104581907 A | 4/2015 | |
| KR | 100881223 B1 | 2/2009 | |
| WO | 2015191190 A1 | 12/2015 | |
| WO | WO-2015191190 A1 * | 12/2015 | H04W 48/10 |
| WO | 2016089846 A1 | 6/2016 | |

OTHER PUBLICATIONS

International Search Report dated May 25, 2018 for PCT/US2018/018595.

U.S. Non-Final Office Action dated Dec. 3, 2020 issued for corresponding U.S. Appl. No. 16/994,135.

U.S. Non-Final Office Action dated Dec. 10, 2019 issued for corresponding U.S. Appl. No. 16/489,747.

Chinese Office action dated Aug. 24, 2020 issued for corresponding China Patent Application No. 201880015406.3.

International Search Report dated May 25, 2018 for PCT/US2018/017761.

* cited by examiner

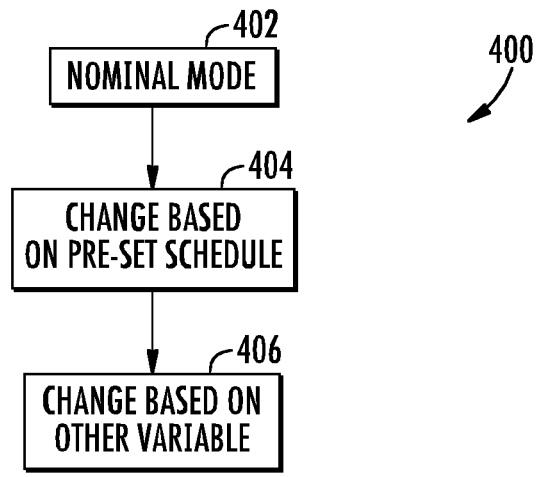
FIG. 4
| MODE | RATE | BATTERY LIFE |
|---|---|---|
| NOMINAL | 1/SEC | 2.5 YEARS |
| FOUR TIMES AS FAST | 4/SEC | 1.6 YEARS |
| HALF AS FAST | 1 EVERY 2 SECONDS | 2.8 YEARS |
| 4 HOURS AT 4X, 4 HOURS AT NOMINAL, 16 HOURS AT HALF | DYNAMIC PERFORMANCE | 2.55 YEARS (BETTER THAN NOMINAL WITH PERIODS OF BETTER PERFORMANCE) |
FIG. 5
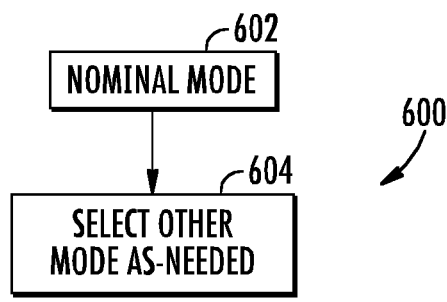
FIG. 6

ACCESS CONTROL SYSTEM WITH DYNAMIC PERFORMANCE TUNING

CROSS-REFERENCE TO RELATED APPLICATIONS

This application is a continuation application of U.S. patent application Ser. No. 16/489,745, filed Aug. 29, 2019, which is a 371 of International Application PCT/US2018/018595, filed Feb. 19, 2018, which claims the benefit of provisional application Ser. No. 62/465,974, filed Mar. 2, 2017.

BACKGROUND

The present disclosure relates generally to access control systems, and more particularly, to a system and a method to increase performance without decreasing battery life.

Various mobile devices have been utilized to open locks via an infrared 'beam' to the lock, which provides directionality, or a 'push the button' on the box to wake up the lock for subsequent communication over Bluetooth. With the capability present in Bluetooth Low Energy (BTLE) to communicate with very low power, new system architectures allow the lock to be 'always on' and sending periodic BTLE advertisements, such as once per second so that the lock may be opened without requiring a wake up procedure. The low power requirements result in many years of battery life.

Adding BTLE always on capability to a lock in addition to physical card readers reduces the overall battery life. Additionally, in order to minimize the impact on the battery life, the advertisement rate for a BTLE device must be slowed down to a point to where the operational current draw is acceptable for a given battery life expectancy (i.e. 2 years). The rate at which a connectable device sends BTLE advertisements directly affects the amount of time required to connect to the device because after a person indicates intent to open a lock with their mobile device, the mobile device must wait for the next advertisement before connecting to the device. This leads to a trade-off in performance for how fast the lock opens versus battery life.

SUMMARY

A method of dynamically changing a mode of advertising for at least one of a multiple of access controls according to one disclosed non-limiting embodiment of the present disclosure can include transmitting advertisements from an access control according to a nominal mode; and changing the nominal mode in response to a pre-set schedule.

A further embodiment of the present disclosure may include changing the nominal mode in response to the pre-set schedule includes changing the nominal mode to a different mode.

A further embodiment of the present disclosure may include that the pre-set schedule is based on at least one of a temporal variable, time of day, and day of month.

A further embodiment of the present disclosure may include changing the nominal mode in response to the pre-set schedule includes changing the nominal mode to a slower mode or a faster mode for a period of time in response to an event of the access control.

A further embodiment of the present disclosure may include wherein the event is at least one of an actuation of the access control, a low battery indication, a door open event, and an office mode state.

A further embodiment of the present disclosure may include that changing the nominal mode in response to the pre-set schedule includes changing the nominal mode to a slower mode or a faster mode while a state of a variable of the access control persists.

A further embodiment of the present disclosure may include that the variable is a deadbolt status.

A method of dynamically changing a mode of advertising for at least one of a multiple of access controls according to one disclosed non-limiting embodiment of the present disclosure can include transmitting advertisements from an access control according to a nominal mode and changing the nominal mode in response to an adjustable schedule.

A further embodiment of the present disclosure may include that changing the nominal mode in response to the adjustable schedule includes changing the nominal mode to a faster mode.

The method as recited in claim 8, wherein changing the nominal mode in response to the adjustable schedule includes changing the nominal mode to a slower mode.

A further embodiment of the present disclosure may include that the adjustable schedule is selected in response to a remote device.

A further embodiment of the present disclosure may include that the adjustable schedule to adjust the performance setting from the nominal condition is performed on an as-needed basis by the remote device.

A further embodiment of the present disclosure may include adjusting the performance setting from the nominal condition in response to building occupancy.

A further embodiment of the present disclosure may include adjusting the performance setting from the nominal condition in response to a mobile device user behavior.

A further embodiment of the present disclosure may include adjusting the performance setting from the nominal condition in response to a check in event.

An access control system according to one disclosed non-limiting embodiment of the present disclosure can include an access control operable to transmit advertisements at a nominal rate and at least one other rate different than the nominal rate.

A further embodiment of the present disclosure may include that the rate is selected in response to a dynamic schedule.

A further embodiment of the present disclosure may include that the rate is selected in response to a pre-set schedule.

A further embodiment of the present disclosure may include that the access control is a lock.

A further embodiment of the present disclosure may include that the advertisements using Bluetooth low energy (BTLE) which is receivable by a mobile device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the dis-

Figure 1:
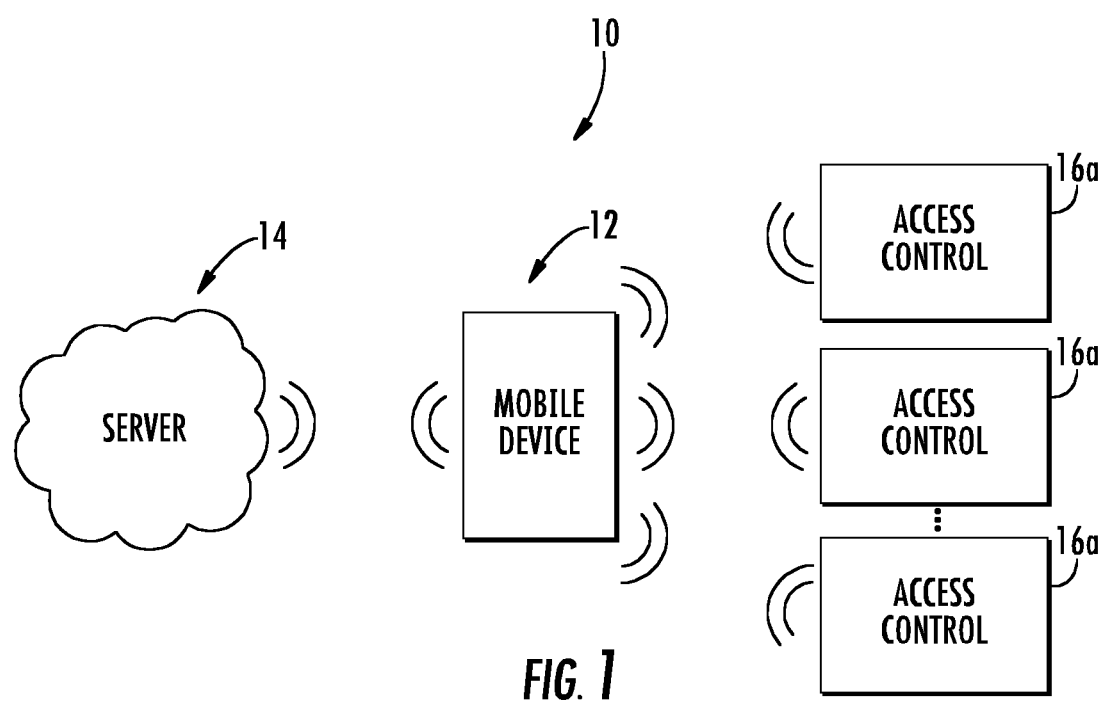
Figure 2:
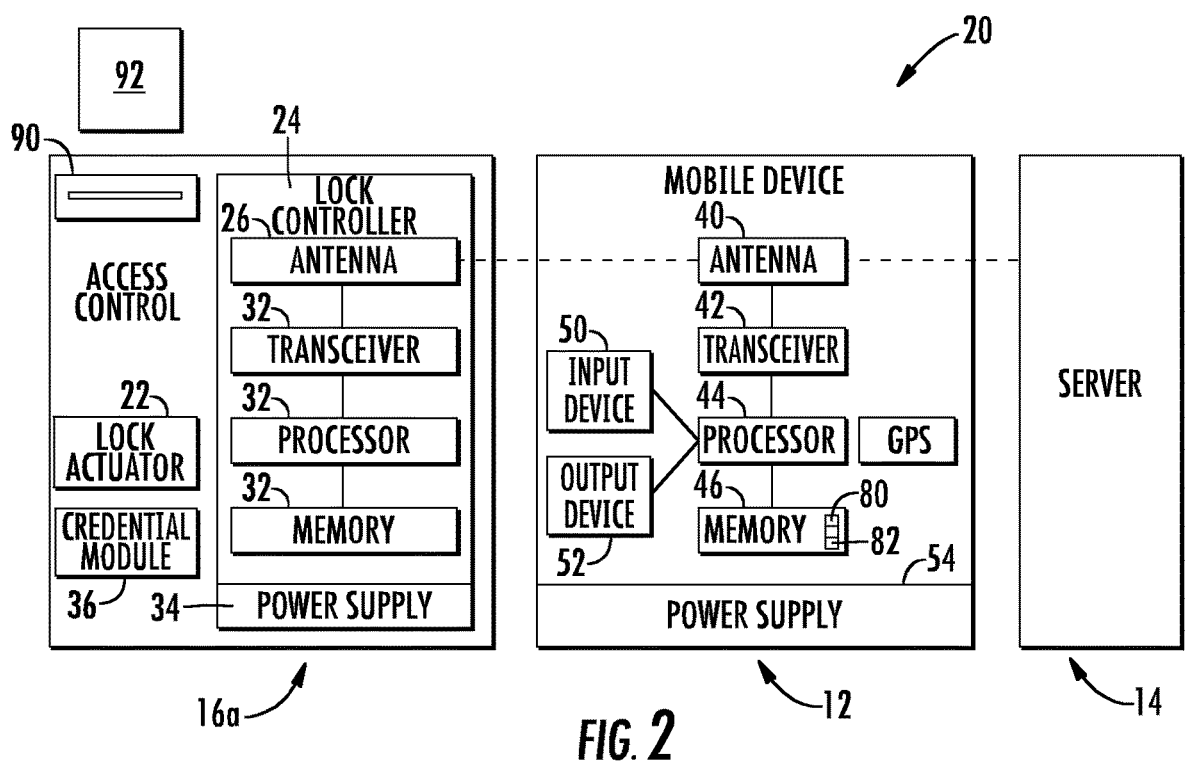
Figure 3:
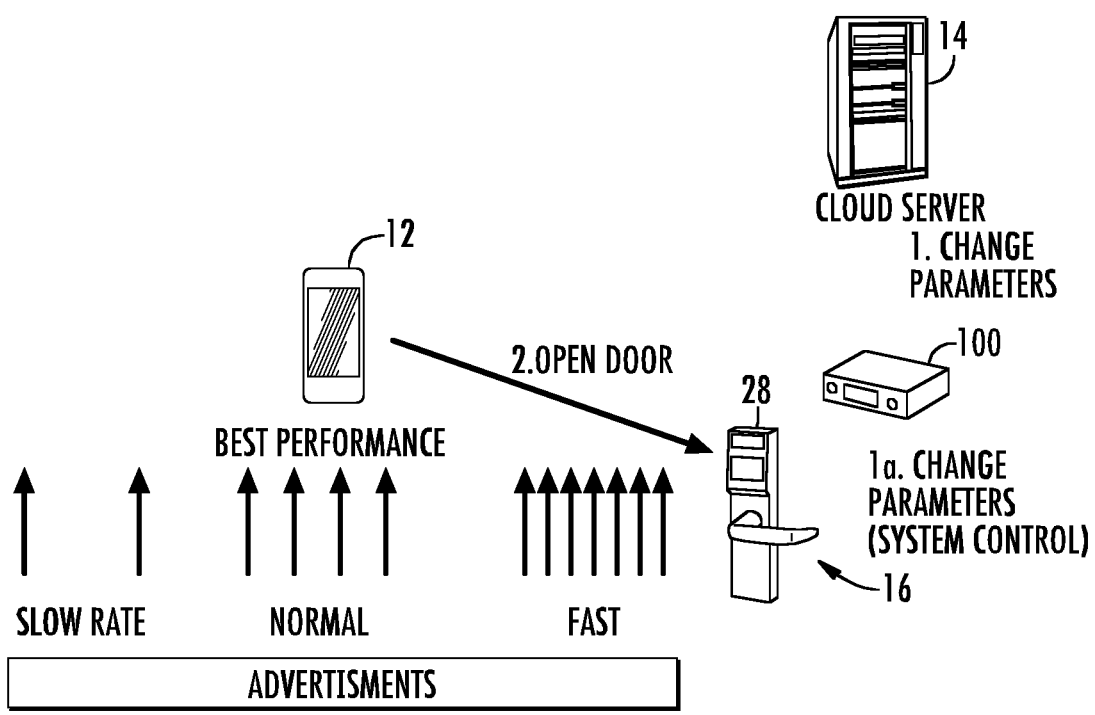

3 closed non-limiting embodiment. The drawings that accompany the detailed description can be briefly described as follows:

FIG. 1 is a general schematic system diagram of an access control system;

FIG. 2 is a block diagram of the access control system;

FIG. 3 is a block diagram of the access control system in which a mode of advertising is dynamically changed;

FIG. 4 is a flowchart of a method to dynamically change a mode of advertising according to one disclosed non-limiting embodiment;

FIG. 5 is a chart comparing example modes of advertising; and

FIG. 6 is a flowchart of a method to dynamically change a mode of advertising according to one disclosed non-limiting embodiment.

DETAILED DESCRIPTION

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone, which is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and

4 may, for example, be the lock of a lockbox, a door lock, or a lock core. Although the present disclosure focuses primarily on access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

With reference to FIG. 3 and FIG. 4, each access control 16 advertises using, for example, Bluetooth low energy (BTLE) which is received by the mobile device 12 (step 402). Advertisements from multiple access controls 16 can be received because they are all in proximity to the mobile device 12, or they are transmitting at a high enough power that they are within a distance from the mobile device 12 to be received.

Each of the multiple of access controls 16 dynamically changes its advertising performance in response to the server 14 and/or the lock controller 24. That is, the mode of advertising is dynamically changed, i.e. the advertising rate, transmit power, etc., over time such that an overall average power consumption provides for longer battery life, while also providing for peak time periods where the lock performance is increased to facilitate higher user satisfaction.

With reference to FIG. 4, in one embodiment, the access control system 10 dynamically changes the mode of advertising for at least one of the multiple of access controls 16 in response to a pre-set schedule. A method 400 of advertisement follows a pre-set schedule for self-modifying the performance dynamically. Initially, a nominal advertisement rate mode is set as a default (step 402). The nominal advertisement rate mode may be, for example, one (1) advertisement per second that results in a 2.5 year battery life (FIG. 5).

Then, in response to a pre-set schedule based on, for example, the time of day, the day of the week, and other temporal metrics, the nominal advertisement rate may be changed (step 404) to a faster rate such as four (4) advertisements per second, which may be beneficial for lock open response times during check-in times of the day (e.g. 3 pm-5 pm), or to a slower rate such as one (1) advertisements every two (2) second, which may be beneficial during the night for overall lower use of the energy from the batteries 34 in the lock 16. The result may be an overall better battery life than nominal, for example 2.55 years (FIG. 5), because of energy saved in the batteries 34 during times of slower advertising as compared to additional energy used during times of optimal performance. Other variables such as room occupied/not occupied, i.e. when deadbolt is thrown or there is a recent door open/closed event may further facilitate selection of a particular mode (step 406). That is, a look-up table or other reference may be used by the lock processor 30 along with a time component to dynamically change the mode of advertising based on the time or based on other variables that can override the time schedule. Overriding the time schedule can be for a time period based on a configured amount of time after an event. Or the override can persist indefinitely while the access control 16 is in a particular state. An example of another variable where the access control 16 is in a particular state is when a lock 16 deadbolt is closed, the advertising rate can be slower because there is no expectation of being able to open the lock 16 while the deadbolt is closed which benefits to saving energy and a longer battery life. When the deadbolt returns to an open state, the regular schedule can be resumed.

For an alternate, non-limiting example of an override by an event, if a lock 16 is actuated once, there is some probability that it may be opened again in a short period of time, so for a short time period the advertising rate may be faster after a door open event to benefit how quickly subsequent lock openings can be made. After some amount of time the schedule may be resumed. The example given is a non-limiting example of an event and there are other access control 16 or access control system events that may be used to dynamically adjust the advertising mode. Other non-limiting examples of other events includes low battery indications in a lock that slow advertisements to conserve remaining battery capacity, and a door opened state that slows the advertisements if the door is already open or is held open since there is no need to unlock the door to enter the room, and an office mode state where the lock is in an unlocked state and there is no need to unlock the door to enter the room so the advertisements can be slower, and also a blocking mode where the lock may not be opened and is blocked for access so therefore the advertising rate can be slower. These are just a few non-limiting examples of types of states and events that can occur in an access control 16 or access control system 10 that can override a scheduled advertising mode.

With reference to FIG. 6, in another embodiment, the access control system 10 includes an adjustable mode of advertising for at least one of the multiple access controls 16. A method 600 of advertisement includes an adjustable schedule for an associated access control 16. For example, a remote device 100 (FIG. 3) such as a set-top box, a thermostat, a controller mounted nearby, and/or a gateway type device connects to an associated access control 16 to adjust the mode or schedule of advertising from a nominal mode (step 602) on an as-needed or on-going basis (step 604). The nominal mode (step 602) is when the access control 16 is advertising at a nominal or average rate that normally achieves a desired battery life but may not achieve the desired fastest operation time, for example unlocking a door. The method 600 facilitates a cloud-based schedule that can be adjusted dynamically to optimize for, for example, guest behavior, building occupancy, etc.

One non-limiting example of method 600 using guest behavior, or more generally users of mobile device 12 behavior, to dynamically adjust the schedule may include the location of the user relative to access control 16 as determined by the current location of the mobile device 12 or as determined by the access control system 10. For example, if the mobile device 12 is known to be in a proximity to the access control 16, the nominal mode can be changed to a faster rate while the mobile device 12 is nearby. Knowing the location of the mobile device 12 can be determined by indoor location technologies or other well-known technologies in the art of identifying the position of a mobile device inside or outside a building. The position of the mobile device 12 can be sent to the server 14 or remote device 100 or both so that the schedule can be dynamically changed (step 604). When the mobile device 12 is no longer nearby the access control 16, then the schedule may be set to a slower mode to conserve battery life. In addition to the location of the mobile device 12 relative to the access control 16, positioning technologies can be used to determine whether the mobile device 12 is moving closer or farther away. This can be further used to determine that a person with a mobile device 12 is getting close and will be getting closer to an access control and triggering method 600 to dynamically change the advertising mode so that when they arrive at the access control it is already operating at a faster rate. This method may also be used when, for example, the mobile device 12 is not yet within Bluetooth range of the access control 16.

Another non-limiting example of method 600 using other variables such as room reservation, check-in times, check-out times, and/or special events to dynamically adjust the schedule may include selection of a desired mode or re-configuration of a pre-programmed schedule stored in lock memory 32. For example, when a hotel guest checks-in to their room, this event may be registered by server 14 and either sent to remote device 100 or an adjustment request is sent to remote device 100 so that the schedule can be dynamically changed (step 604) before the hotel guest arrives so that the adjusted schedule optimizes for guest performance when using their mobile device 12 with the lock 16. After a room has been vacated, and is no longer occupied, then a nominal schedule can be set back into the access control 16 by the remote device 100 where the adjusted schedule conserves more battery life. Dynamic scheduling facilitates an optimized interaction between the user of the mobile device 12 and the access control 16 while also optimizing for conserving energy in batteries 34 for as long of a battery life as possible.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of dynamically changing a mode of advertising, comprising:
   transmitting advertisements via Bluetooth® low energy (BTLE) which is receivable by a mobile device from an electromechanical lock according to a nominal mode of a pre-set schedule that achieves a desired battery life; and
   changing the nominal mode of the pre-set schedule to an adjustable schedule, wherein the adjustable schedule is selected in response to commands received from a remote device.

2. The method as recited in claim 1, wherein selecting the adjustable schedule, to adjust the performance setting from the nominal condition, is performed on an as-needed basis by the remote device.

3. The method as recited in claim 2, further comprising selecting the adjustable schedule in response to building occupancy.

4. The method as recited in claim 2, further comprising selecting the adjustable schedule in response to a mobile device user behavior.

5. The method as recited in claim 1, further comprising selecting the adjustable schedule in response to a hotel guest check in event.

6. The method as recited in claim 1, further comprising overriding the pre-set schedule for a period of time in response to an event.

7. The method as recited in claim 6, wherein the event comprising a deadbolt of the electromechanical lock being closed slowing the advertising rate less than nominal.

8. The method as recited in claim 1, further comprising resuming the pre-set schedule in response to a deadbolt of the electromechanical lock being in an open state.

9. The method as recited in claim 1, wherein the remote device comprises one of a set-top box, a thermostat, a controller, or a gateway device that connects to the electromechanical lock.

10. The method as recited in claim 9, wherein the remote device is operable to adjust the mode or schedule of advertising from the nominal mode on an as-needed or on-going basis.

11. The method as recited in claim 1, further comprising selecting the adjustable schedule in response to a hotel guest check out event.

12. The method as recited in claim 1, further comprising resuming the pre-set schedule in response to a hotel guest check out event.

* * * * *